Patented Oct. 25, 1949

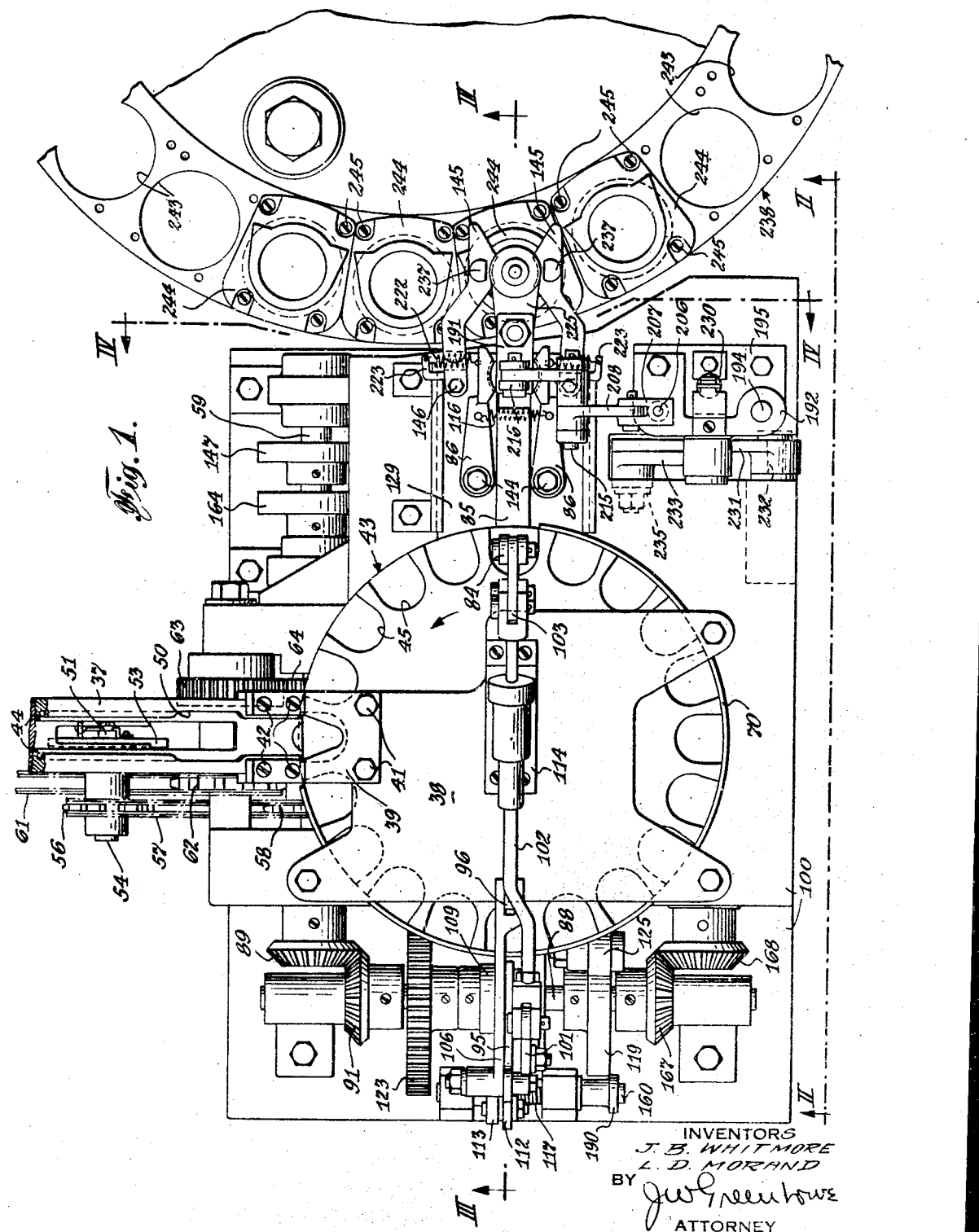

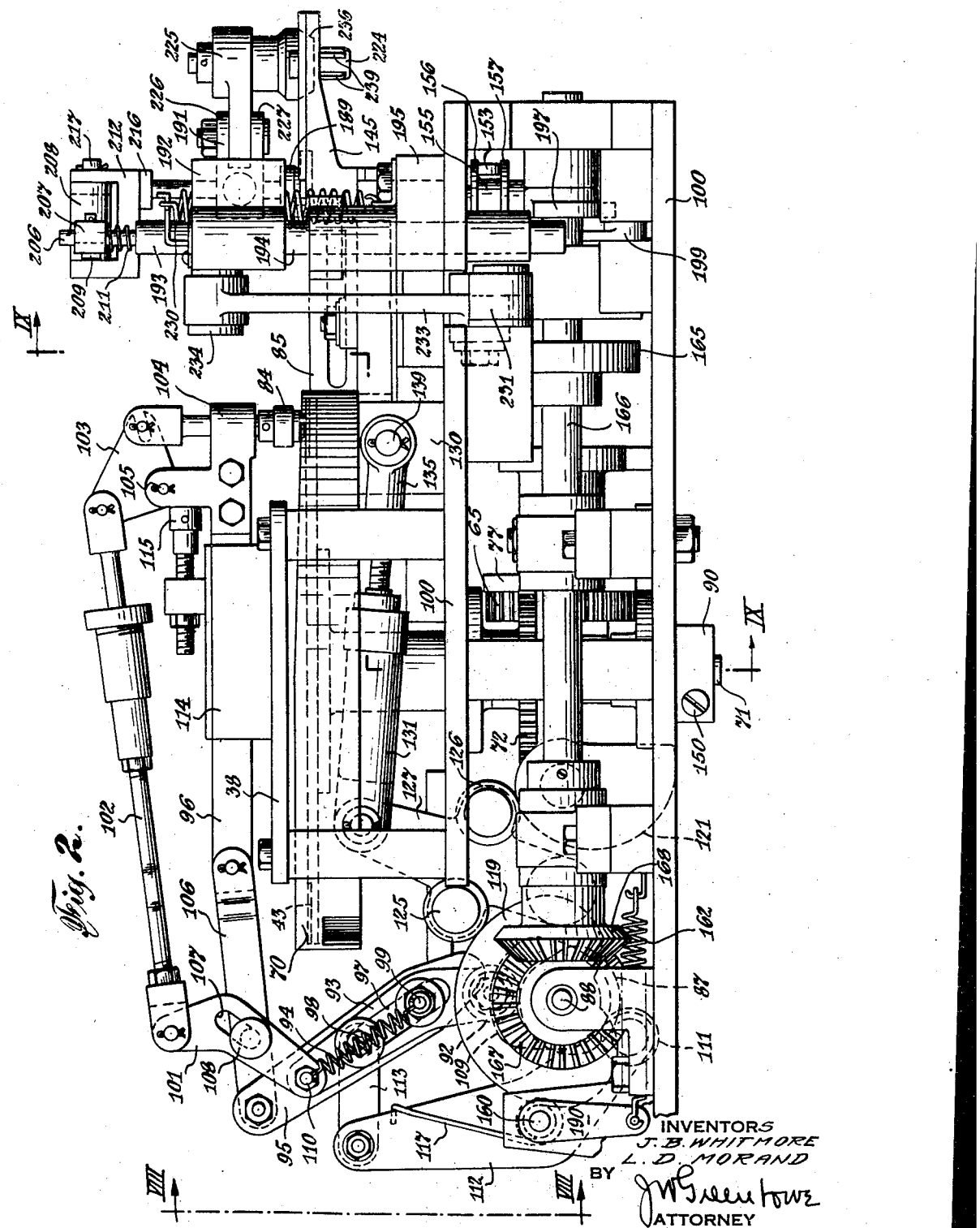

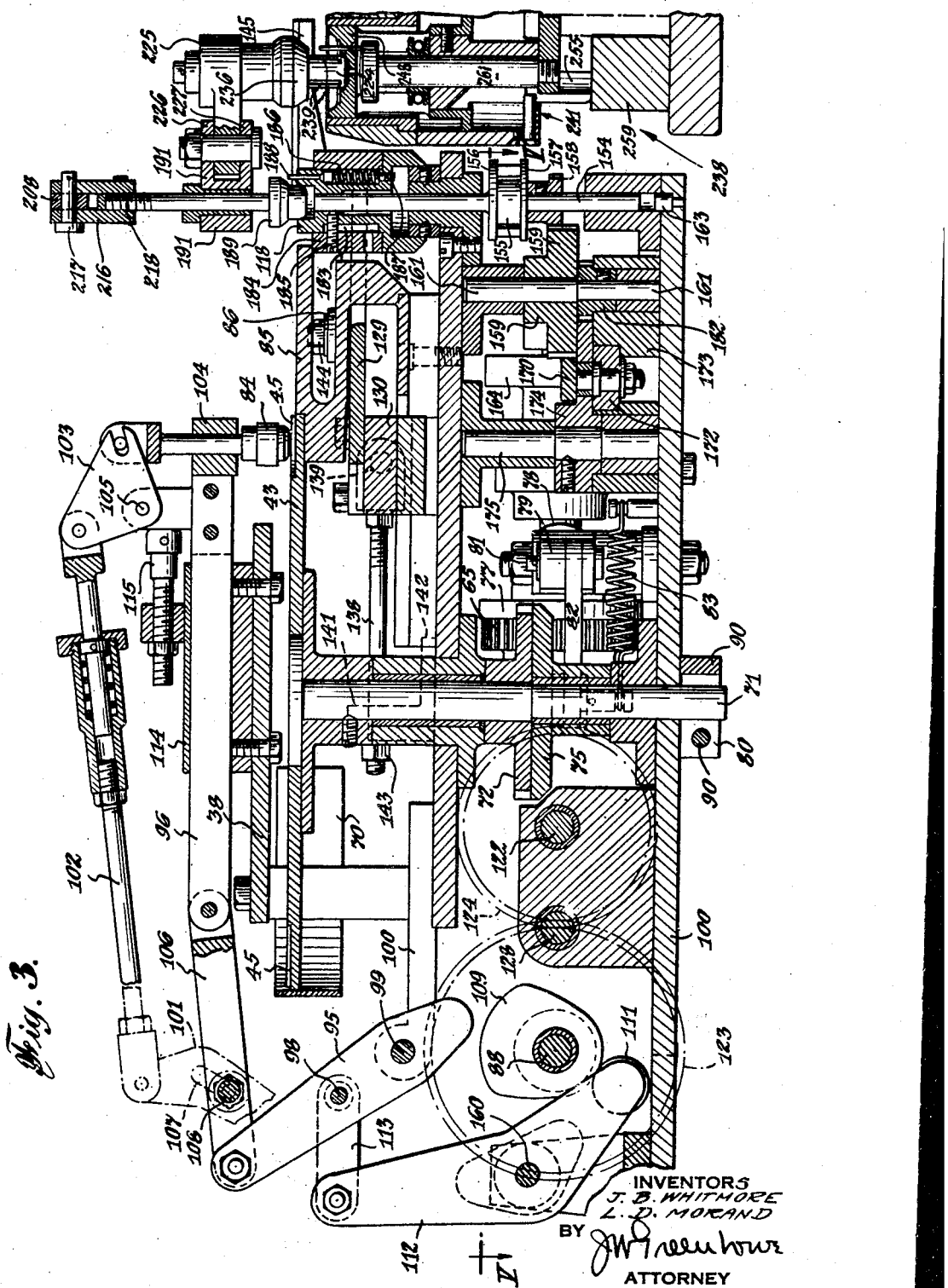

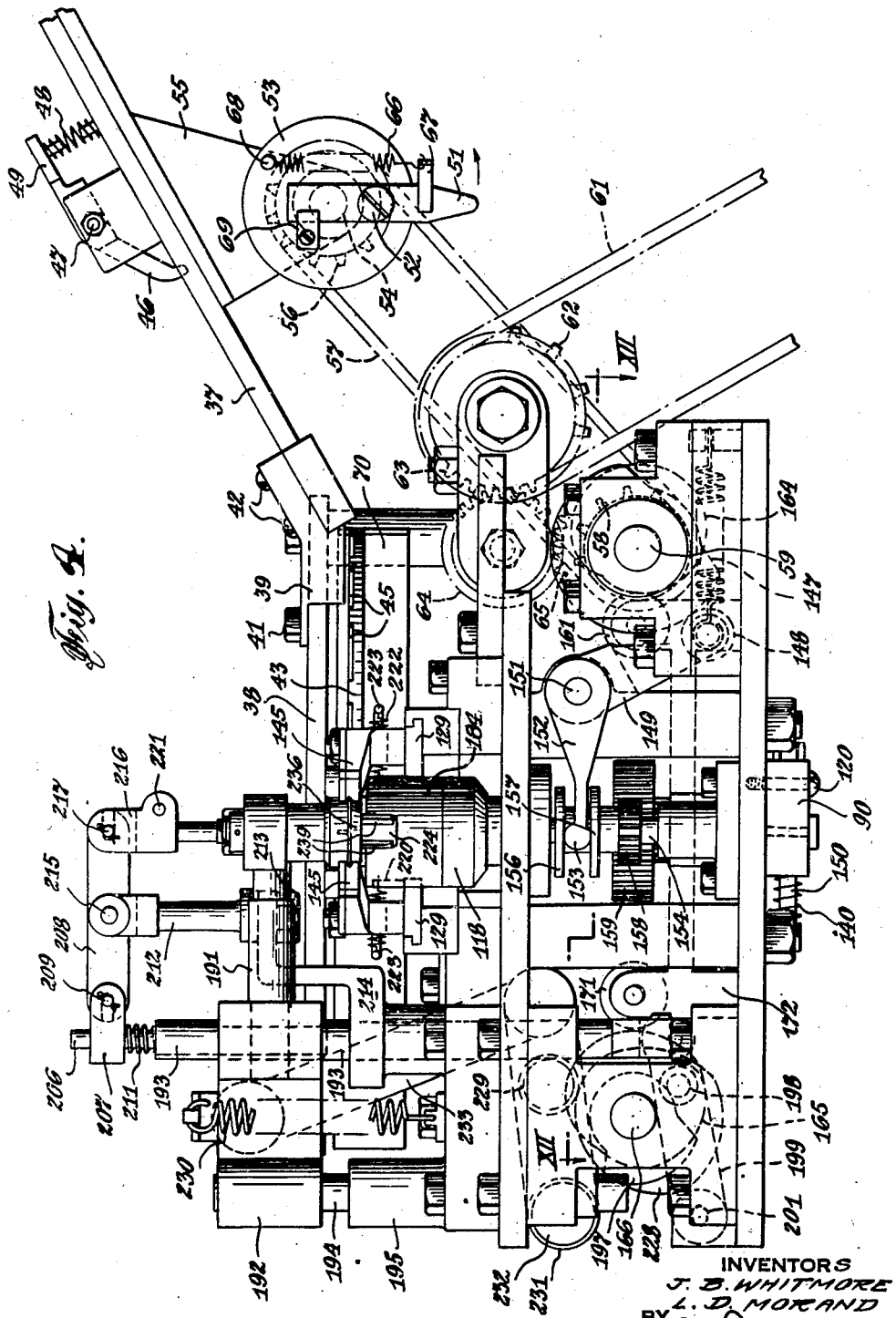

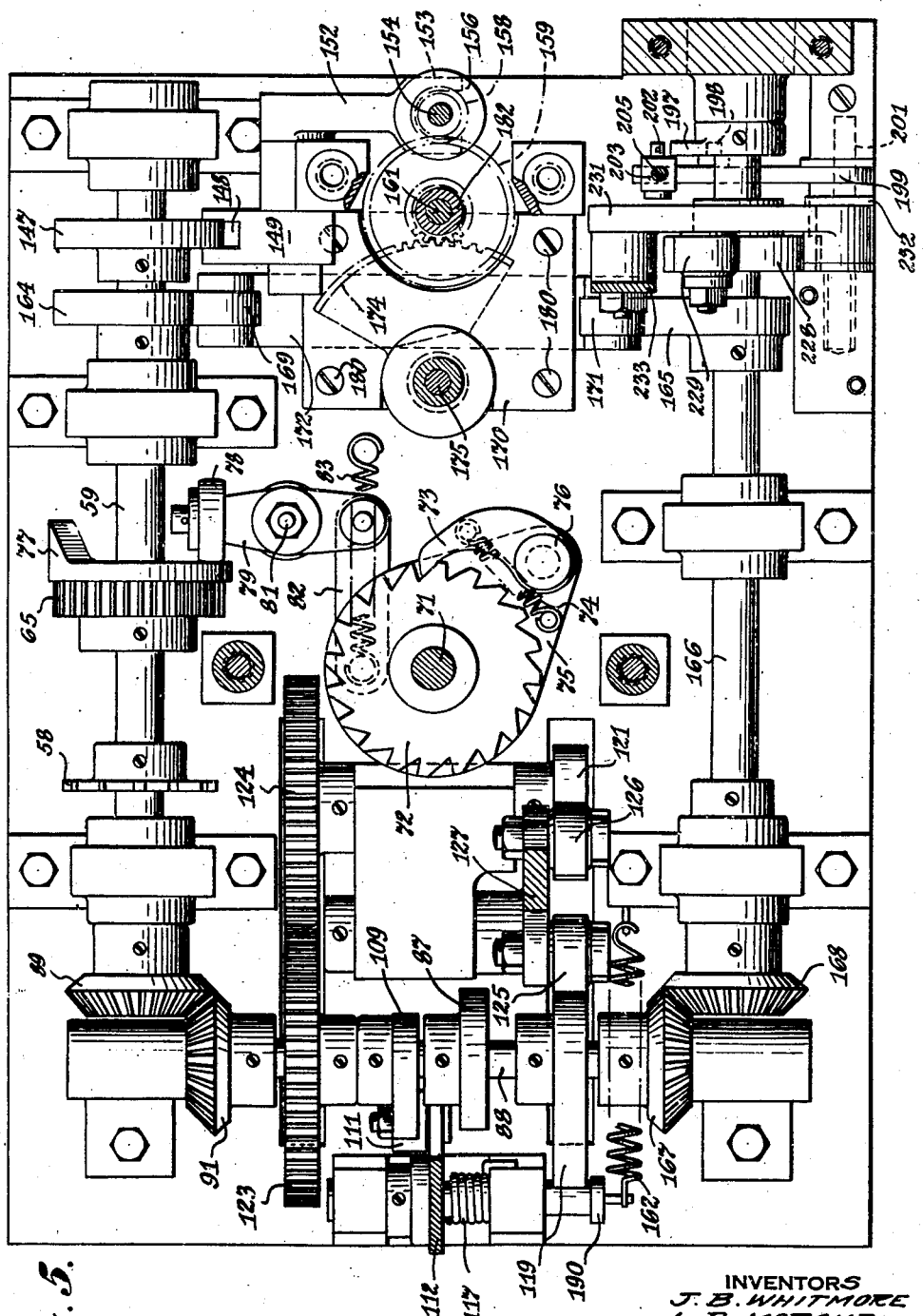

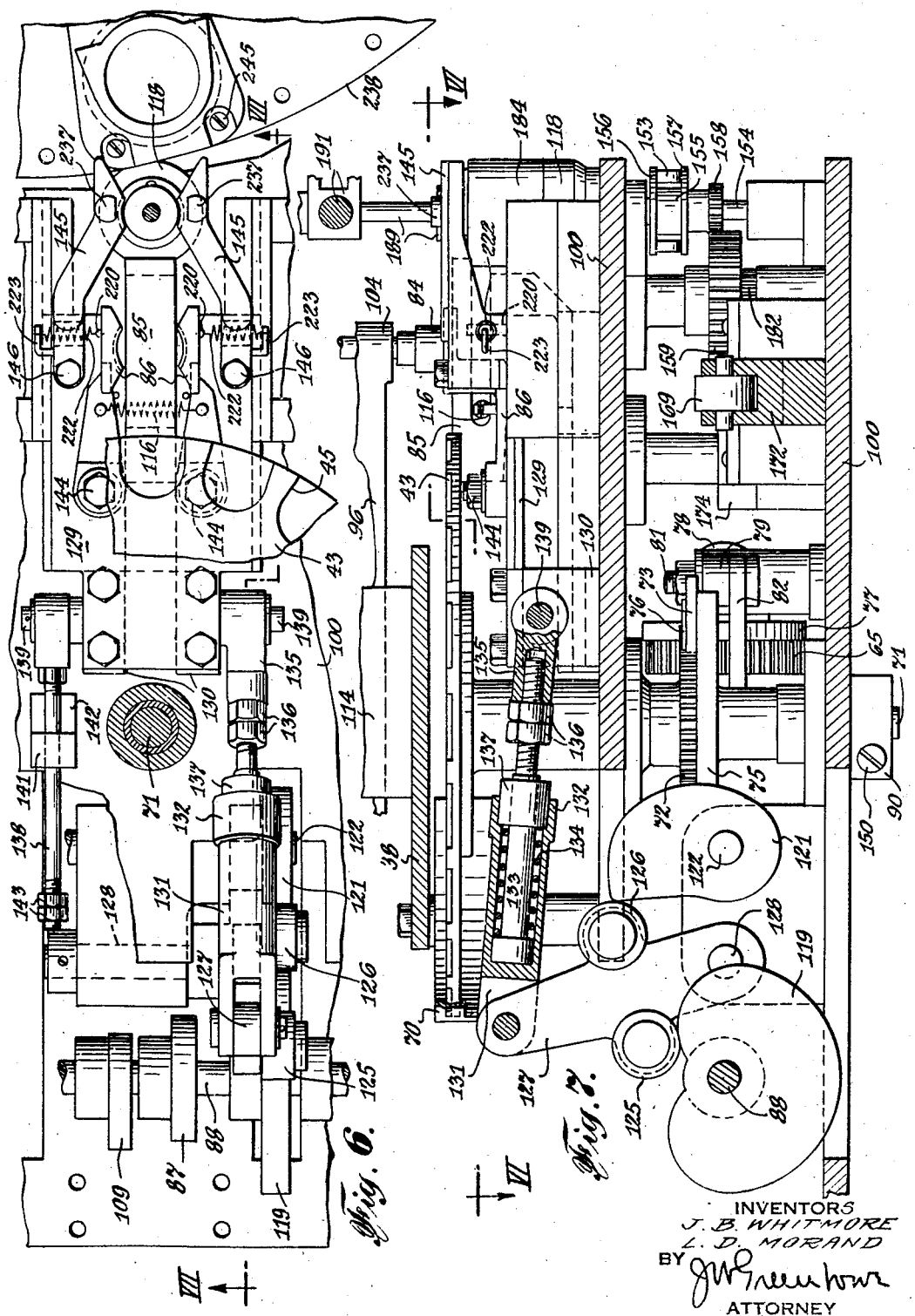

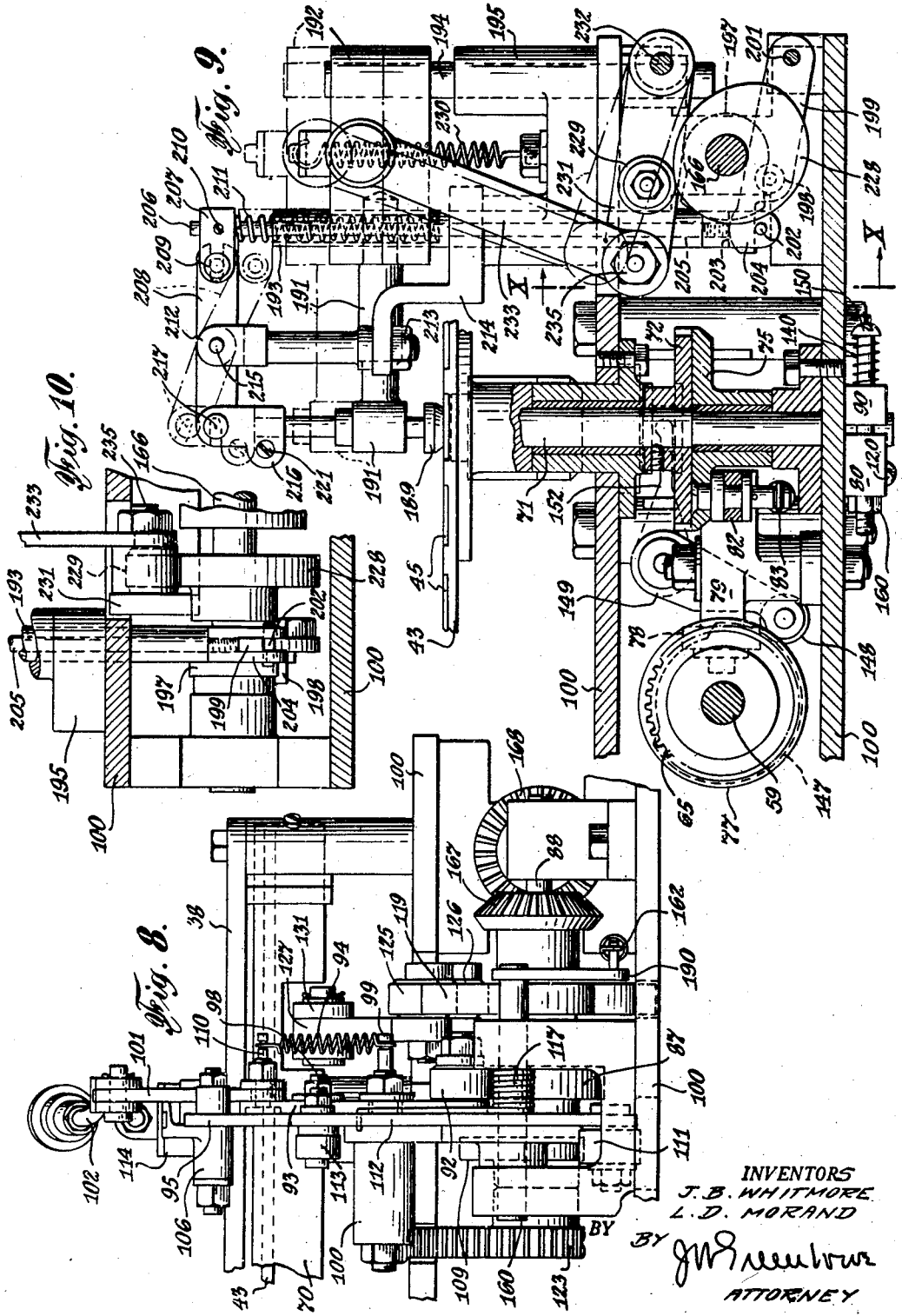

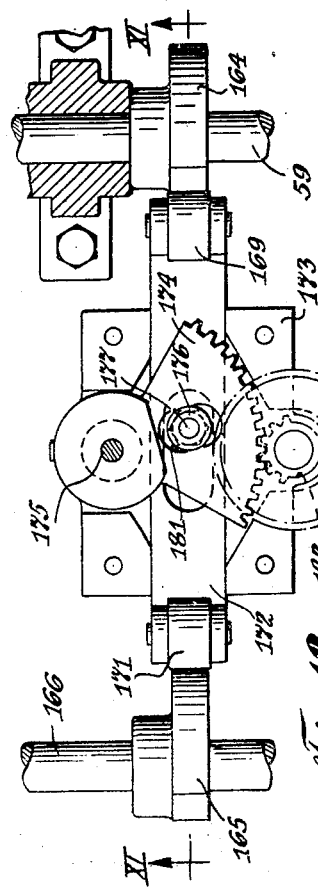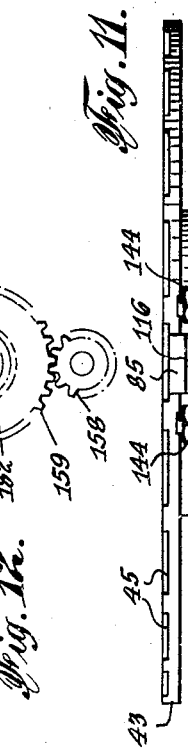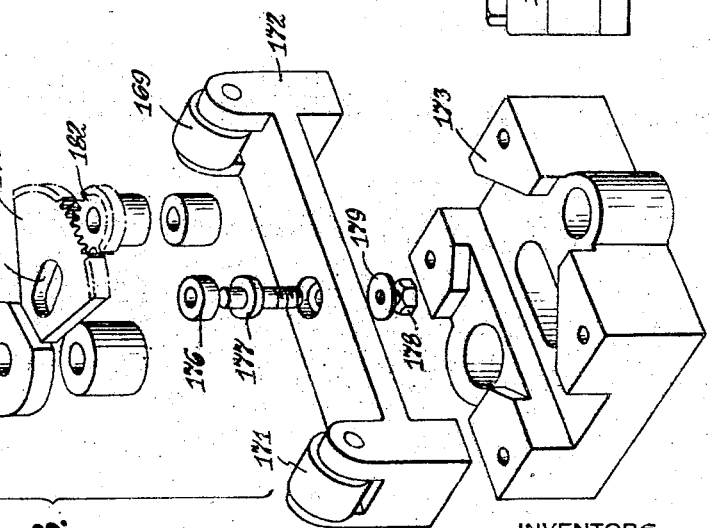

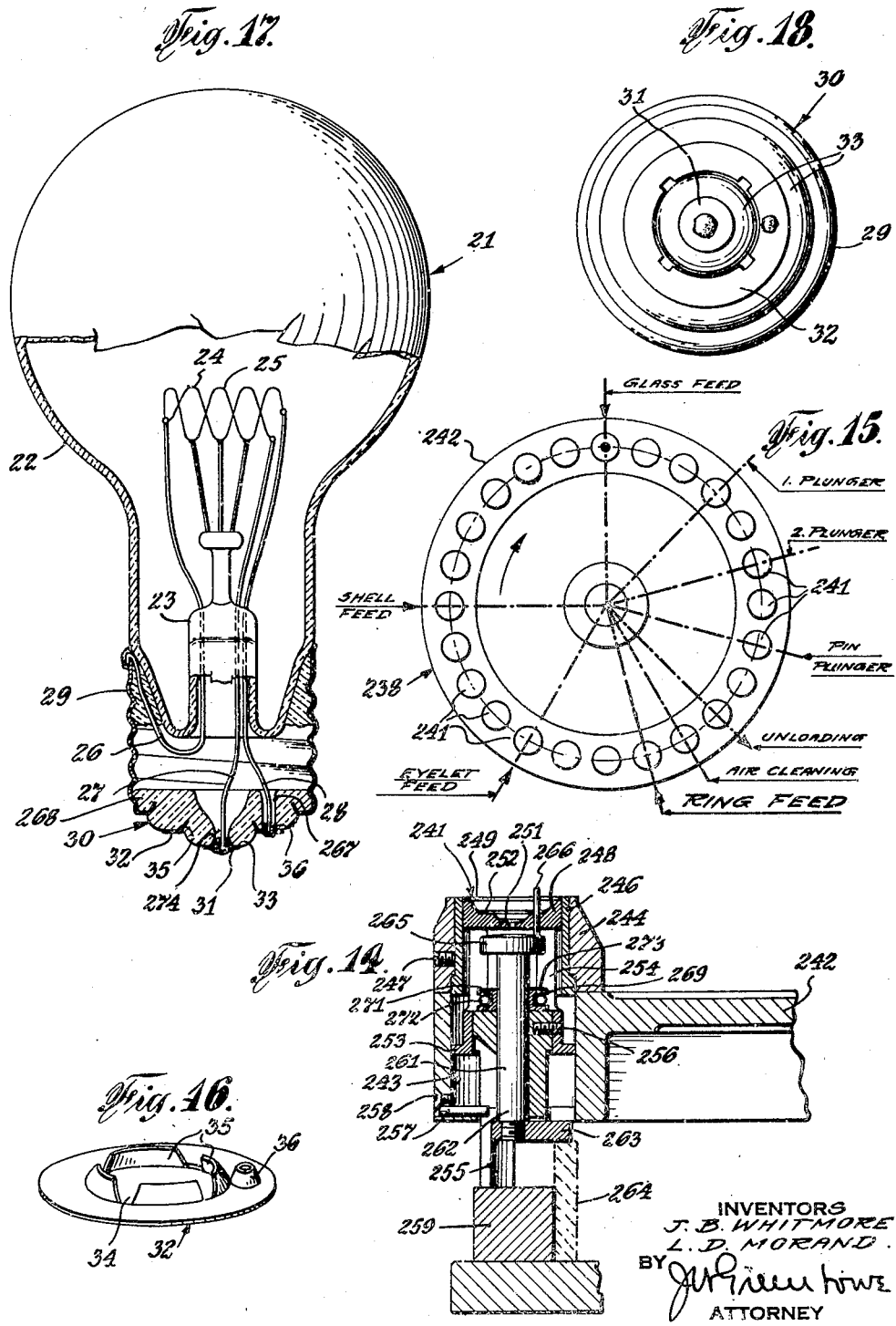

2,486,085

UNITED STATES PATENT OFFICE 2,486,085

METHOD AND MACHINE FOR FEEDING RING CONTACTS IN BASE MAKING

James B. Whitmore, Bloomfield, and Louis D. Morand, Clifton, N. J., assignors to Westinghouse Electric Corporation, East Pittsburgh, Pa., a corporation of Pennsylvania Application August 26, 1942, Serial No. 456,200

20 Claims. (Cl. 49—2)

This invention relates to base making and, more particularly, to a method and machine for feeding a contact ring to a base-making machine.

The principal objects of our invention, generally considered, are to provide a method and machine for effecting the ring feeding operation.

A further object of our invention is the provision of a method for feeding rings to a glass base machine, whereby the same are accurately positioned in the dies thereof, after being turned so that the side aperture is disposed in the proper position for aligning with a positioning pin which maintains an aperture through the glass insulation for receiving a lead-in conductor to connect therewith.

A still further object of our invention is the provision of a machine for feeding rings to a base-making machine, so that said rings are properly positioned in the dies of said machine and in the proper time relation with respect to the positioning of the base shells and center contacts, said machine involving means for feeding the rings one by one to a special dial having a series of pockets or slots around its peripheral portion, each large enough to hold just one ring, said rings being carried by said dial to a selected position, means being provided to engage and move said rings, one at a time, out of the dial and along a slide on which each ring is in turn grasped by rear transfer fingers, carried to a turning head, turned while held down by a plunger so that said rings are properly positioned with respect to the base-making machine, moved forward by front transfer fingers, and then engaged by a placer plunger which releases said fingers and drops the rings in desired positions in the base-making machine.

Other objects and advantages of the invention, relating to the particular arrangement and construction of the various parts, will become apparent as the description proceeds.

Referring to the drawings:

Fig. 1 is a plan of base ring feeding mechanism, embodying our invention, and part of a base-making machine, modified to take base rings in accordance with said invention.

Fig. 2 is a side elevational view of the mechanism, as on the line II—II of Fig. 1, in the direction of the arrows.

Fig. 3 is a vertical sectional view on the line III—III of Fig. 1, in the direction of the arrows.

Fig. 4 is a front elevational view of the mechanism, as on the line IV—IV of Fig.1, in the direction of the arrows.

Fig. 5 is a horizontal sectional view on the line V—V of Fig. 3 in the direction of the arrows.

Fig. 6 is a horizontal sectional view on the line VI—VI of Fig. 7, in the direction of the arrows.

Fig. 7 is a vertical sectional view on the line VII—VII of Fig. 6, in the direction of the arrows.

Fig. 8 is a fragmentary side elevational view on the line VIII—VIII of Fig. 2, in the direction of the arrows.

Fig. 9 is a fragmentary vertical sectional view on the line IX—IX of Fig. 2, in the direction of the arrows.

Fig. 10 is a fragmentary vertical sectional view on the line X—X of Fig. 9, in the direction of the arrows.

Fig. 11 is a vertical sectional view on the line XI—XI of Fig. 12, in the direction of the arrows.

Fig. 12 is a fragmentary horizontal sectional view on the line XII—XII of Fig. 4, in the direction of the arrows.

Fig. 13 is an exploded view of certain of the parts shown in Figs. 11 and 12.

Fig. 14 is a vertical sectional view of one of the glass receiving dies and the actuating cams.

Fig. 15 is a diagrammatic plan of the glass receiving dies.

Fig. 16 is a perspective of one of the base rings embodying our invention, as handled by the mechanism.

Fig. 17 is a lamp including one of the said rings as a part thereof, and

Fig. 18 is a bottom plan of the base portion of the lamp shown in Fig. 17.

The mechanism shown in the drawings is designed for use with a base-making machine of the type described and claimed in the Walker et al. patents, Nos. 1,210,237 and 1,210,238, both dated December 26, 1916. Such a machine makes bases each with only a first-fed center contact, feeding thereof being specifically claimed in the first of said patents, and a thereafter-fed outer shell, feeding thereof being specifically claimed in the second of said patents, whereas the illustrated embodiment of the mechanism of the present invention is for feeding a ring or third contact ahead of the placing of the center contact in one die or shell holder after another to make bases, of thte "mogul" type, with three contacts for the so-called "Three-lite" lamp, such a lamp being illustrated in Figs. 17 and 18. The base of said lamp, therefore, instead of having only a shell and center contact, has an intermediate ring which is positioned first in each die or shell holder and embedded in the glass insulation between the shell and center contact member.

In Figs. 17 and 18 we have designated the lamp shown by the reference character 21, as comprising a bulb 22 and a mount 23 including the filaments 24 and 25 which may be energized separately or together by means of the lead-in conductors 26, 27 and 28, the ends of which respectively connect with the shell 29 of the base 30, the center contact 31, and the ring 32, said elements being held together by glass insulation 33 formed therearound.

The ring contact element 32 is shown in perspective in Fig. 16. In the embodiment illustrated, it is desirably cut from sheet brass, or similar material, generally circular in outline with a center opening 34, from the peripheral portion defining which extend tapering, curved, and inclined lugs 35 which in the course of manufacture become embedded in the glass insulation 33. The ring is also provided with an axially-offset apertured or frusto-conical hollow boss 36 which receives the lead 28 and is soldered or otherwise connected thereto. The ring is thus of special construction, avoiding sharp angles and prongs which had been used, thereby for the first time making it suitable for automatic or machine feeding.

The molten glass which is fed to the base-making machine to form the base insulation 33, desirably passes through a die or guide of durable material, such as described and claimed in the Weller patent, No. 2,031,083 of February 18, 1936, and the Richardson patent, No. 2,190,296 of February 13, 1940, the temperature of the molten glass stream being desirably controlled in accordance with the Richardson et al. patent, No. 2,116,450 of May 3, 1938.

Briefly, the operations of the machine for feeding rings 32 to the shell supports or bottom glass dies (it being understood that the Walker et al. patents, previously mentioned, disclose how center contacts and shells of bases are thereafter fed to such a machine) are that (1) said specially constructed rings pass from a hopper to a slide, along which they are fed singly by a finger onto a special dial having a series of pockets or slots around its peripheral portion, each of which is just large enough to hold one ring. (2) The rings are preferably carried by the dial three-quarters of a revolution to a selected position where (3) each is, in turn, engaged and pushed by a plunger out of its pocket in the dial and along a ring slide on which it is, in turn, grasped by rear transfer fingers. (4) These fingers carry each ring to (5) a turning head which rises, a holding plunger comes down, the head rotates, and a locating pin enters the lead wire boss and turns the ring about its axis to the position it is to occupy in the bottom die of the base-making machine, where the lead-receiving aperture in its peripheral portion receives a plunger pin for forming a lead-receiving hole in the glass. The head then stops turning, and the rear transfer fingers move back until (6) the front fingers grasp the ring, whereupon the turning head descends, the holding plunger rises, the front fingers carry the ring over the bottom glass die, and a ring placer plunger comes down and pushes the ring from the fingers into said die without altering the subsequent eyelet or shell feed.

(1) *Feeding rings from hopper to dial*

Referring in detail to the illustrated embodiment of the apparatus or machine portion of our invention, Figs. 1 and 4 show a slide 37 extending from the ring hopper (not shown) to the top frame plate 38, being connected thereto as by means of a gusset 39, bolts 41 and screws 42. The ring hopper may consist of a barrel, similar to the shell hoppers of the Walker et al. patents previously referred to, except that one ring at a time is removed from the bottom portion and transferred to the slide 37. The slide is inclined at an angle steep enough to allow the rings to move by gravity from the hopper to the ring dial 43. The slide 37 has a groove 44 in each side element to receive edge portions of the rings 32, while allowing them to slide freely to the dial 43.

The rings are fed singly by mechanism associated with the slide 37 to control the number of rings out of the hopper. The slide is kept approximately three-quarters full. The hopper itself is operated by an electric motor and automatically stops when the slide is filled to the desired extent.

After the rings are loaded into the slide they are discharged at the bottom end, one at a time, onto the dial 43 as said dial indexes, so that each pocket 45 of the dial receives one ring. This permits the rings to be divided and accurately positioned, as is desirable for the next operation.

The mechanism for feeding the rings down the slide consists of a finger 46 pivoted with respect to the slide 37, as indicated at 47, and normally urged to its lowermost position by means of spring 48 acting between a rearward or upward extension 49 of said finger and an abutment on the slide 37. This finger, therefore, prevents rings from moving therebeyond until a ring is forcibly moved past it.

A rotating finger 51 is provided for feeding rings past the finger 46. This finger 51 is rotatably mounted on a bolt 52 carried by a rotatable member 53, including a shaft 54 journalled in and supported by bracket 55 depending from the slide 37. Shaft 54 carries a sprocket wheel 56 driven by a chain 57 from a sprocket wheel 58 on the left hand drive shaft 59 of the machine. This shaft 59 is in turn driven from the same source of power which operates the shell hopper of the base machine, thus synchronizing the ring feed with that of the shells and eyelets to the base machine. The drive for the shaft 59 is through chain 61, sprocket wheel 62, gear 63 carried by the same shaft as sprocket wheel 62, idler 64, and gear 65 on shaft 59.

A consideration of Fig. 1 will show that the upper flanges defining grooves 44 are cut away to provide an opening 50. The purpose of this is to permit the rings to be removed at this point in case of a jam in the slide or at the dial. If in so doing the dial indexes without all of the pockets 45 thereof filled, the operator has time to load the dial by hand. This is one of the reasons for the relatively large movement of the dial between the ring-feed position and the point where the rings are pushed therefrom to the transfer fingers.

By virtue of the drive mechanism thus described, the finger 51 rotates counterclockwise, as indicated by the arrow in Fig. 4, periodically engages the ring 32 which is then held by the finger 46, and moves it free thereof against the resistance of the spring 48 to allow it to slide to position in the indexed pocket 45 of the dial 43, as shown most clearly in Fig. 1. If some obstruction prevents free release of the ring from the finger 46, breakage of the mechanism is prevented by the finger 51 being resiliently held in the position shown in Fig. 4 by the spring 66 acting between a projection 67 from said finger and a connecting member 68 on the rotating member 53, whereby it normally holds the finger 51 in the position illustrated against the abutment member 69, but allows it to rotate clockwise therefrom if necessary.

(2) Operation of dial

The dial 43 is secured to rotatably-mounted drive shaft 71 which carries a ratchet 72, in turn driven by an indexing pawl 73 resiliently urged into engagement therewith by spring 74 which acts between it and plate 75, to which said pawl is connected as by means of pivot member 76 (Fig. 5). The plate 75, which has a running fit on the shaft 71, is oscillated to cause the pawl 73 to drive the ratchet 72 and its connected dial, as by means of a cam 77 on the drive shaft 59 engaging a roller 78 on an operating lever 79 pivoted to the frame of the machine, as indicated at 81, and connected to the pawl plate 75 by means of a link 82. A spring 83 acts on the pawl plate to urge it clockwise and thereby maintain engagement between the roller 78 and the cam 77. The ratchet 72 has teeth corresponding numerically with the ring dial pockets 45, in this instance twenty, so that each ratchet operation advances the ring dial one pocket.

Braking or friction-drag means are desirably associated with the drive shaft 59 in order to prevent overrunning during operation. Such means in the present embodiment takes the form of brass blocks 80 and 90 frictionally engaging the preferably steel shaft 71 (Fig. 9). The block 80 is desirably pivotally secured to the base plate of the frame 100, as by means of a pin or bolt 120, and the block 90 is urged by coil spring 140 to hold both resiliently against the shaft. The spring 140 is mounted on a bolt 150 the head of which is notched for adjustment by means of screw driver. The bolt passes loosely through the block 90, is threaded to the block 80, and the other end is engaged by a lock nut 160 pressing against the outer face of the block 80.

(3) Removal of rings from dial

After the dial 43 has been rotated step by step, counterclockwise, to carry the ring in question 270°, while prevented from dislodgment by the cylindrical retainer 70, said ring finally reaches a position immediately beneath a plunger 84 which is to act for the purpose of removing the ring from the dial and carrying it to the right, as viewed in Figs. 1, 2, 3, 6 and 7, along the ring slide 85, where it will be engaged by the rear transfer fingers 86. The plunger 84 has a vertical movement and an independently-controlled horizontal movement.

The vertical movement is effected by a cam 87 on the rear cam shaft 88, which shaft is driven from the drive shaft 59 through bevel gears 89 and 91. The cam 87 effects the desired vertical reciprocatory movement of the plunger 84 by engaging a roller 92 on cam lever 93, held in engagement with said cam by means of spring 94, and slidable on lever 95 which imparts horizontal motion to the plunger slide 96, as by having a slot 97 receiving bolts 98 and 99 projecting laterally from the lever 95. (Fig. 2.) The bolt 99 also serves to pivot the lever 95 to the frame 100 of the machine (Fig. 3) and the spring 94 acts between the bolt 99 and the pivot member 110 connecting the lever 93 to its link 101. (Fig. 8.)

Motion is transmitted from the cam lever 93 through link 101, adjustable link 102, plunger raising link 103, the last of which is pivoted to plunger bearing bracket 104, as indicated at 105. The link 101 is slidably pivoted on the link 106 which connects the lever 95 with the plunger slide 96, as by being slotted, as indicated at 107, to receive a pivot member 108 on said link 106. It will, therefore, be seen that rotation of the rear cam shaft 88 effects vertical movement of the plunger 84 through the cam 87.

Horizontal movement of the plunger 84 is effected by means of cam 109 acting on roller 111 carried by cam lever 112 fixed on a pivotally mounted shaft 160, controlled by return spring 117, and connected by link 113 to lever 95 by means of bolt 98. (Fig. 3.) Action of the spring 117 is augmented by coil spring 162 acting on the free end of crank 190 fixed on shaft 160. The lever 95 acts on plunger bearing bracket 104 through link 106 and plunger slide 96, the latter of which moves in plunger slide block 114 carrying an adjustable stop 115 for the plunger bearing bracket 104.

It will, therefore, be seen that operation of the machine causes the plunger 84 to move into engagement with an indexed ring 32 therebeneath, slide it from a position corresponding with that shown in Figs. 2 and 3, to the right along the ring slide 85, to where it is lodged between the rear transfer fingers 86, which are resiliently held in gripping engagement therewith by means of spring 116, and then return to its starting position.

(4) Movement of rings by rear transfer fingers to turning head position

When a ring 32 has been transported by the plunger 84 along the ring slide 85 by movement of said plunger from the position shown in Fig. 3 to that of Figs. 6 and 7, the ring is lodged between and resiliently gripped by the rear fingers 86, which fingers are there in their rearmost or retracted positions. Movement of the ring from this position to a more forward position to be engaged by the turning head 118 is effected by cams 119 and 121, respectively mounted on shafts 88 and 122. Shaft 122 is driven from shaft 88 by engagement of a gear 123 fixed on the shaft 88 with one 124 fixed on the shaft 122. (Fig. 5.)

These two cams 119 and 121 operate together as a single box cam by respectively engaging rollers 125 and 126, both on lever 127, pivoted to the frame at 128, to cause said lever to operate the transfer finger slide 129 through link block 130 bolted thereto, back and forth between the position shown in Figs. 6 and 7 and that shown in Figs. 2 and 3, by means of adjustable resilient linkage device 131, whereby a ring engaged between the fingers 86 is moved forward to a position directly over the turning head 118.

The resilient linkage device, as shown most clearly in Fig. 7, comprises a housing member 132 in which operates plunger 133 controlled by spring 134. The free or outer end of the plunger 133 is adjustably connected to a threaded socket member 135 and locked in adjusted position by nuts 136. The housing member 132 around the plunger 133 is closed by means of a bushing 137 in which the plunger may reciprocate. Reciprocatory movement of the block 130 is controlled by a stop rod 138 pivoted to the member 139, which also connects the socket member 135 to said block. The rod 138 slides in the upstanding portion 141 of the angular stop device 142 secured to the frame of the machine. The extreme outer limit of the block 130 is thus set by adjustment of the nuts 143.

The rear transfer fingers 86 are pivoted to the slide 129 by bolts 144, a set of front transfer fingers 145 being likewise pivoted to the same slide 129 by means of bolts 146. These fingers 145 are for the purpose of gripping a ring, after being released by the rear fingers and turned to the proper position, for inserting in the glass machine.

(5) Turning of rings

Upon movement of a ring to position directly over the turning head 118, the latter being in depressed position, raising of said head is effected by action of cam 147 on roller 148 of cam lever 149 pivotally mounted on the frame by means of pivot pin 151 to which it is fixed. The other end of the pivot pin 151 has an arm 152 extending therefrom and bifurcated as indicated at 153 to straddle a portion of the turning head shaft 154, at a spool portion 155 between outstanding flanges 156 and 157 thereof, as shown most clearly in Figs. 3 and 4.

Vertical movement is permitted, without disengagement between the pinion 158 on the shaft 154 and the gear 159 on the turning head intermediate shaft 161, by making the face of the gear 159 long enough, as shown most clearly in Fig. 3. This Figure 3 shows the shaft 154 in its uppermost position, downward movement of said shaft being limited by the stop member 163.

The movement of the head 118 to turn a supported ring to the proper position for feeding to the glass machine, while said head is in elevated position as shown in Fig. 3, is effected by means of cooperating cams 164 and 165, the former of which is fixed to the drive shaft 59 and the latter to the drive shaft 166. Shaft 166 is driven from the shaft 88 by bevel gears 167 and 168. The cams 164 and 165 respectively engage rollers 169 and 171 on turning head cam slide 172 which reciprocates in its slide block 173, as shown most clearly in Figs. 11, 12 and 13.

The slide 172 actuates a gear segment 174 connected to the block 173 by pivot member 175, and prevented from undesired removal by cover plate 170 held thereon by screws 180, by engagement of roller 176, connected thereto by means of pivot member 177, nut 178, and washer 179, in a slotted portion 181 of said segment. Thus reciprocatory movement from side to side of the cam slide 172 causes the gear segment 174 to operate the pinion 158, through the pinion 182 and gear 159 fixed on the shaft 161 and effect the desired rotary movement of the head 118.

The head 118 has a cavity 183, closed by a bushing 184 which is secured thereto by set screw 185, containing a spring 186 adjustable in compression by means of set screw 187, and operating a positioning pin 188 to urge it into uppermost position, which position it attains after the head 118 engages a ring 32 and sufficient rotation has occurred to cause it to register with and pass through the apertured ring boss 36.

From the foregoing it will be seen that upon transfer of the ring 32 to a position above the head 118, said head raises and rotates until the pin 188 engages the apertured boss 36 in said ring and turns the latter to the position in which it is to be fed to the glass machine.

While this turning of the ring takes place, it is held in position and prevented from being thrown out of the machine by means of a ring holding plunger 189, which reciprocates downward to the position shown in Fig. 3 to hold the ring in place on the head 118. The plunger 189 reciprocates in a holding arm 191 extending from a reciprocatory block 192 provided with supporting posts 193 and 194, which reciprocate in holding socketed member 195 mounted on the frame of the machine. Movement is effected by cam 197 fixed on shaft 166 and engaging a roller 198 on operating lever 199 pivoted to the frame, as indicated at 201.

The free end of the lever 199 overlies an actuating pin 202, underlies a shoulder 203, and fits between bifurcated portions 204 of an actuating link 205. The upper portion of the link is reduced in section, as indicated at 206, to pass through the supporting post 193 and has a link connector 207 secured to its upper end portion, as by means of a set screw 210. The connector 207 is slidably pivoted to the adjacent bifurcated end portion of the link 208 by means of a pin 209. The link portion 206 carries a coil spring 211, part of which is housed in the post 193, as shown most clearly in Fig. 9, and the upper end of which engages the connector 207.

The link 208 is connected to a standard 212, supported from the frame of the machine by a nut 213 and frame bracket 214 by means of a pivot pin 215, the other similarly bifurcated end of said link 208 being slidably pivoted to the clevis 216 by means of a pin 217. The upper portion of said clevis is bifurcated to receive the end portion of the link 208. The upper end of the plunger 189 is adjustably connected to the yoke 216 by threadable engagement, indicated at 218, as shown in Fig. 3, and tightened by a screw 221.

It will, therefore, be seen that reciprocation of the plunger 189 is effected by action of the cam 197 on the lever 199, through the rod 206, link 208, and yoke 216, either releasing the plunger 189 from the ring 32 or allowing it to be held in engagement therewith by action of the spring 211 for turning to the proper base-machine feeding position.

(6) Placing rings in base machine

The head 118 having stopped, the ring 32 is grasped by the front fingers 145, when the same have been retracted to the position shown in Figs. 6 and 7. These fingers are actuated by springs 222 acting from studs 220 on transfer slide plate 129 to projections 223 on said front fingers. The turning head 118 thereupon drops and the plunger 189 rises, allowing the released ring to be transferred by the front fingers 145 upon movement of the same to the position shown in Fig. 2, so that said ring then underlies the placer plunger 224, as shown in Figs. 2 and 3.

The placer plunger 224 is carried by a holder 225 which is supported between flanges 226 and 227 to the holding arm 191, which, as previously explained, is supported from the reciprocatory block 192. To effect desired movement of the placer plunger 224, the block 192, resiliently urged to its lowermost position by return spring 230, is moved up by cam 228 on shaft 166 engaging roller 229 on lever 231, the outer end of which lever is connected to the frame by pivot pin 232 and the free end of which is connected to the reciprocatory block 192 by link 233. The upper end of the link 233 engages a pivot member 234 projecting from the block 192 and its lower end is pivoted to the lever 231 by bolt 235.

It will, therefore, be seen that after each ring has been moved to position underlying the placer plunger 224, as shown in Figs. 2 and 3, said plunger descends and the bevelled sides 236 thereof engage the correspondingly inclined bosses 237 adjacent the outer ends of the fingers 145, (Fig. 1) forcing said fingers apart and causing them to release the ring and allow the same to drop down into the die 241 of the base-making machine 238 which at the time is indexed with said plunger. The ridges 239 on the plunger 224 pass between the lugs 35 on the ring and prevent turning thereof during its descent until said ring actually passes off the lower end of the plunger.

The base-making machine is diagrammatically represented in Fig. 15 as having twenty-four heads. After unloading and cleaning each glass die assembly or head 241 at the positions indicated, such a head of the machine has its parts positioned as shown in Figs. 3 and 14 at the time of feeding a ring 32 thereto.

The spider 242 of the base-making machine 238 has a series of pockets 243 around its periphery for receiving the elements of the base dies or heads. These elements for each head comprise an upper outer die housing member 244 secured to the spider 242 in any desired manner, as by means of screws 245, as shown in Fig. 1. Inside of this member 244 is a bushing 246, secured in place as by means of a set screw 247. Mounted for reciprocation in the bushing 246 is the die proper or base elements support 248, presenting an upwardly opening pocket, the outer portion 249 of which is formed to support a base shell 29, the inner portion 251 of which is shaped to receive a center contact 31, and the intermediate portion 252 is formed to support a ring 32.

This die proper has a bottom portion 253 connected to the top or base supporting portion by columns 254 and normally connected to an interior cam-actuated member 255 by means of a set screw 256. Turning of the cam-actuated member 255 and the associated die proper 248 is prevented by pin 257 held in place by set screw 258.

The member 255, by action of the cam 259, holds the die proper 248 in upper most position, as shown in Fig. 14. After application of the ring 32 and center contact 31, the die proper 248 is lowered for reception of the shell 29, so that during the glass filling operation, the shell 29 is supported within the bushing 246 and housing 244.

In order to prevent a ring 32, after reception by the die 241, from turing from the proper position for receiving the molten glass, a plunger member 261 has its stem 262 reciprocatingly mounted with respect to the member 255 and carrying a cam-actuated member 263, so that it may be moved from the uppermost position illustrated in Fig. 14 to the lower position (not shown), the push-up cam being designated by the reference character 264.

The head 265 of the plunger 261 carries a pin 266, receivable in a corresponding aperture in the die proper 248, and which passes through the apertured boss 36 of a ring 32 when the latter is fed thereto, thereby holding said ring in the desired position while the base parts are being filled with molten glass and being retracted by a pull-down cam (not shown), which engages the upper face of the part 263 at the proper time, so as to withdraw the pin 266 from the die proper to form the opening 267 through the glass insulation 33 of the base 30 being formed, to allow for passage of the lead-in conductor 28, as shown most clearly in Fig. 17.

In order to prevent undesired movement of the plunger member 261 with respect to the member 255, as because of its stem 262 becoming loose from wear, a friction collar 269, consisting of a plurality of annular members 271 held together about the stem 262 by a coil spring 272, is provided. Movement of the collar 269 to above the position illustrated in Fig. 14 is prevented by overlying shoulders 273. Turning of the plunger 261 with respect to the cam-actuated member 255 is prevented by engagement between shoulders on the latter and cooperating shoulders on the member 263.

It will, therefore, be seen that after a die 241 has been cleaned by air, at which place the cam 259 and the push-up cam 264 operate to move the die proper 248 and the plunger 261 up to the position illustrated in Fig. 14, a ring 32 is fed thereto at the place indicated by "ring feed" in Fig. 15 when the parts are still positioned as shown in Fig. 14. The cam 264 acts only momentarily, the plunger 261 staying in place by frictional action of the collar 269. The spider 242 then moves on until the die reaches the position designated "eyelet feed" in Fig. 15, where the eyelet member 31 is positioned, as in accordance with the Walker et al. patents above referred to.

The cam 259 then allows the die proper 248 and frictionally-held plunger member 261 to descend so that when the die 241 reaches the position designated "shell feed," the die proper is at the bottom of its permitted movement, and the bushing 246 and die proper 248 provides a pocket with walls of substantial height for holding the shell 29 in place during the time the molten glass is fed thereto in the position designated "glass feed," also as in accordance with said Walker et al. patents.

After the shell 29, center contact 31 and ring 32 in the head 241 have received the desired charge of molten glass and said glass has had time to harden to some extent, said glass is acted upon by one or more upper shaping plungers, designated 1 and 2 in Fig. 15, but not otherwise shown. The plunger 261 and its associated pin 266 is then lowered with respect to the die proper 248 by means of the pull-down cam (not shown) leaving the base aperture 267, and a pin plunger descends at the position indicated in Fig. 15 to form the aperture 274 which receives the lead-in conductor 27 for connection with the center contact 31. The die 241 is then unloaded and cleaned, and the operation may be repeated.

From the foregoing, it will be seen that we have devised a machine which acts in synchronization with the base-making machine to accurately place rings, or third contacts of bases to be formed, in one die after another of a base-making machine, the other contacts, that is, the shell and center contact of each base, being placed in accordance with the Walker et al. patents, 1,210,237 and 1,210,238, previously referred to.

Although a preferred embodiment of our invention has been disclosed, it will be understood that modifications may be made within the spirit and scope of the appended claims.

We claim:

1. The method of feeding contact rings comprising placing them one by one in pockets of an intermittently rotating dial, removing said rings one by one from said dial at a different place along its periphery, turning said rings one by one until lead-in-conductor-receiving apertures thereof are properly positioned for an associated base-making machine, and then moving said positioned rings one by one to the lower dies of said base-making machine.

2. The method of feeding contact rings which have apertures for lead-in conductors comprising causing them to feed one by one into pockets of an intermittently rotating dial, removing said rings one by one from said dial, after the same has transferred them through a predetermined angle of rotation, turning said rings one by one about their axes until the lead-in-conductor-receiving apertures thereof are properly positioned for an associated base-making machine, and then accurately dropping said rings one by one into the lower dies of said base-making machine, in properly timed relation with respect to the placement of center contacts and shells for the bases.

3. The method of feeding contact rings comprising placing them one by one in pockets of an intermittently rotating dial, removing said rings one by one from said dial pockets and carrying them radially along a slide, picking up said rings one by one and advancing them still further, turning said rings so that they are properly disposed for insertion in an associated base-making machine, and moving said rings until they one by one are positioned directly over a die of said base-making machine.

4. The method of feeding contact rings comprising moving them one by one in to a dial, intermittently rotating said dial so that peripheral pockets thereof sequentially receive one ring from said hopper, removing said rings one by one from said dial pockets and carrying them radially along a slide, picking up said rings one by one and advancing them still further, turning said rings about their axes so that they are properly disposed for insertion in an associated base-making machine, moving said rings until they one by one are positioned directly over a die of said base-making machine, and then feeding each sequentially downwardly into the die which then registers therewith.

5. The method of making bases for electric lamps comprising feeding a contact ring, which has a single offset aperture for a lead-in conductor, into a pocket of an intermittently rotating dial, removing said ring from said dial, turning said ring until its offset aperture is positioned above and in alignment with a plunger pin of an associated base-making machine, placing said ring in a lower die of said machine, with said pin carried by a die-associated plunger fitting said offset aperture, when the bottom portion of said die and its plunger are in raised position, placing a base eyelet in said die, lowering the bottom portion of said die, placing a base shell therein, feeding molten glass to said die to consolidate the shell, ring and eyelet, forming the glass in said die, and lowering the associated pin plunger to remove its pin from the conductor aperture of said ring.

6. Apparatus for feeding rings comprising means for feeding rings one by one, a dial rotatable about a vertical axis and provided with a plurality of pockets, each of which is adapted to receive one ring, means for rotating said dial so that one pocket after another is brought to register with and receive a ring from the feeding means a plunger slide mounted to move horizontally over said dial, a plunger mounted for vertical reciprocation in said slide, means for operating said plunger, and means for moving said slide over said dial, whereby as the ring-holding pockets one after another register therebeneath, said plunger moves downward, engages a ring, and slides it radially out of said dial.

7. Apparatus for feeding rings comprising means for feeding rings one by one, a dial rotatable about a vertical axis and provided with a plurality of pockets, each of which is adapted to receive one ring, means for rotating said dial so that one pocket after another is brought to register with and receive a ring from the feeding means, a plunger associated with said dial, means for operating said plunger whereby as the ring-holding pockets one after another register therebeneath, said plunger moves downward, engages a ring, and slides it radially out of said dial, a plate carrying front and rear sets of fingers, means for causing said plate to reciprocate whereby said rear fingers grasp a ring as it is released by said plunger and move it forward to a desired position, a head having a spring-actuated positioning pin projecting upwardly therefrom, means for raising said head and simultaneously rotating the same beneath the ring held by said fingers, and a holding plunger depressible to maintain said ring in engagement with said head, for turning the ring to a desired position.

8. Apparatus for feeding rings comprising means for feeding rings one by one, a dial rotatable about a vertical axis and provided with a plurality of pockets, each of which is adapted to receive one ring, means for rotating said dial so that one pocket after another is brought to register with and receive a ring from the feeding means, a plunger associated with said dial, means for operating said plunger, whereby as the ring-holding pockets one after another register therebeneath, said plunger moves downward, engages a ring, and slides it radially out of said dial, a plate carrying front and rear sets of fingers, means for causing said plate to reciprocate whereby said rear fingers grasp a ring as it is released by said plunger and move it forward to a desired position, a head having a spring-actuated positioning pin projecting upwardly therefrom, means for raising said head and simultaneously rotating the same beneath the ring held by said fingers, a holding plunger depressible to maintain said ring in engagement with said head, for turning the ring to the desired position, means for retracting said finger-carrying plate to cause the front fingers to grasp said ring, and means for withdrawing said turning head and plunger and moving said finger-carrying plate to carry said ring forward to another position.

9. Apparatus for feeding rings comprising means for feeding rings one by one, a dial rotatable about a vertical axis and provided with a plurality of pockets, each of which is adapted to receive one ring, means for rotating said dial so that one pocket after another is brought to register with and receive a ring from the feeding means, a plunger associated with said dial, means for operating said plunger, whereby as the ring-holding pockets one after another register therebeneath, said plunger moves downward, engages a ring, and slides it radially out of said dial, a plate carrying front and rear sets of fingers, means for causing said plate to reciprocate whereby said rear fingers grasp a ring as it is released by said plunger and move it forward to a desired position, a head having a spring-actuated positioning pin projecting upwardly therefrom, means for raising said head and simultaneously rotating the same beneath the ring held by said fingers, a holding plunger depressible to maintain said ring in engagement with said head, for turning the ring to the desired position, means for retracting said finger-carrying plate to cause the front fingers to grasp said ring, means for withdrawing said turning head and plunger, means for moving said finger-carrying plate forward to move said ring to another position, a placer plunger aligned with the last mentioned position of the ring, and means to cause said placer plunger to descend in registry with the ring, separate the front fingers, and release said ring.

10. Apparatus for placing base contact rings, each of which has an aperture offset from its axis for receiving a lead wire, in a machine for incorporating the same in bases comprising means for feeding said rings one by one, means for grasping each ring and moving it to a location where it is to be turned, means for turning each ring about its axis while in said location to an aperture position desired for placing it in a lower die of said base-making machine, and means for moving each ring after so turning until it overlies said die and then releasing it to drop into place therein.

11. Apparatus for placing base contact rings, each of which has an aperture offset from its axis for receiving a lead wire, in a machine for incorporating the same in bases comprising a dial rotatable about a vertical axis and provided with a plurality of peripheral pockets, each of which is to receive one ring, means for feeding said rings one by one to said pockets as they are indexed with respect to said feeding means, means for withdrawing said rings one by one from another position along the periphery of said dial as said pockets index therewith, means for grasping each ring and moving it to a location where it is to be turned, means for turning each ring while in said location about its axis to an aperture position desired for placing it in a lower die of said base-making machine, and means for moving each ring after so turning until it overlies said die and then releasing it to drop into place therein.

12. In apparatus for making bases for electric lamps wherein a machine has a series of movable dies with vertically reciprocable bottom portions for supporting the base elements and receiving molten glass for consolidating said elements, means for feeding an eyelet to each die, means for lowering the bottom portion of each die, and means for then feeding a base shell thereto, the combination therewith of a single plunger pin cooperating with each bottom die portion for making a lead-receiving hole in the contact ring portion of each base being formed, means for feeding, one by one, base contact rings, each of which has a single aperture in its peripheral portion for receiving a lead wire, means for turning each ring about its axis to a position so that its aperture will register with said plunger pin when it is placed in one of said dies, means for moving each ring until it overlies a die and then releasing it to drop in place therein, with said pin received in its lead aperture, prior to the feeding of the eyelet and base shell thereto, means for feeding molten glass to said die after the feeding of said eyelet and base shell, to consolidate said ring, eyelet and shell, and means for shaping said glass and withdrawing said pin to leave a hole therein for a lead connection to said ring.

13. The method of making bases for electric lamps comprising moving a contact ring, which has a single offset aperture for a lead-in conductor, along a predetermined path, turning said ring until its offset aperture is positioned above and in alignment with a plunger pin of an associated base-making machine, and then dropping said ring into a lower die of said machine, with said pin, carried by a die-associated plunger, with said pin, carried by a die-associated plunger, received in the offset aperture of said ring.

14. The method of making bases for electric lamps comprising moving a contact ring, which has a single offset aperture for a lead-in conductor, along a predetermined path, turning said ring until its offset aperture is positioned above and in alignment with a plunger pin of an associated base-making machine, placing said ring in a lower die of said machine, with said pin carried by a die-associated plunger fitting the offset aperture of said ring, the bottom portion of said die and its plunger being in raised position, placing a center contact in said die, lowering the bottom portion of said die, placing a base shell therein, feeding molten glass to said die to consolidate the shell, ring and center contact, forming the glass in said die, and lowering the associated pin plunger to remove its pin from the offset aperture of said ring.

15. Apparatus for feeding rings comprising a plate carrying front and rear sets of fingers, means for causing said plate to reciprocate, grasp a ring between its rear fingers and move it forward to a desired position, a head having a spring-actuated positioning pin projecting upwardly therefrom, means for raising said head and simultaneously rotating the same beneath the ring held by said fingers, and a holding plunger depressible to maintain said ring in engagement with said head for turning the ring to a desired position.

16. Apparatus for feeding rings comprising means for feeding rings one by one, a dial rotatable about a vertical axis and provided with a plurality of pockets each of which is adapted to receive one ring, means for rotating said dial so that one pocket after another is brought to register with and receive a ring from the feeding means, a plunger associated with said dial, means for operating said plunger whereby as the ring-holding pockets one after another register thereunderneath, said plunger moves downward, engages a ring, and slides it radially out of said dial, a plate carrying fingers, and means for causing said plate to reciprocate, grasp a ring as it is released from said plunger and move it forward.

17. Apparatus for feeding rings comprising a plate carrying front and rear sets of fingers, means for causing said plate to reciprocate, grasp a ring between its rear fingers, and move it forward to a desired position, a head having a spring-actuated positioning pin projecting upwardly therefrom, means for raising said head and simultaneously rotating the same beneath the ring held by said fingers, a holding plunger depressible to maintain said ring in engagement with said head for turning the ring to a desired position, means for retracting said finger-carrying plate to cause the front fingers to grasp said ring, and means for withdrawing said turning head and plunger and moving said finger-carrying plate to carry said ring forward to another position.

18. Apparatus for feeding rings, which have apertures for lead-in conductors, comprising a plate carrying front and rear sets of fingers, means for causing said plate to reciprocate, grip a ring between its rear set of fingers and move it forward to a desired position, a head having a spring-actuated positioning pin projecting upwardly therefrom, means for raising said head and simultaneously rotating the same beneath the ring held by said fingers, so that said pin engages the ring in its lead-in conductor aperture and turns it to a desired position, a holding plunger depressible to maintain said ring in engagement with said head for said turning operation, means for retracting said finger-carrying plate to cause the front fingers to grip said ring, means for withdrawing said turning head and plunger, means for moving said finger-carrying plate forward to move said ring to another position, a placer plunger aligned with the last mentioned position of the ring, and means to cause said placer plunger to descend in registry with the ring, separate the front fingers, and release said ring.

19. Apparatus for placing base contact rings, each of which has an aperture offset from its axis for receiving a lead wire, in a machine for incorporating the same in bases comprising means for moving said rings one by one along a predetermined path, means for grasping each ring and moving it to a location where it is to be turned, means for turning each ring while in said location about its axis to an aperture position desired for placing it in a lower die of said base-making machine, and means for moving each ring after so turning until it overlies said die and then releasing it to drop into place therein.

20. In apparatus for making bases for electric lamps, wherein a machine has a series of movable dies for supporting the base elements and receiving molten glass for consolidating said elements, the combination therewith of a single plunger pin cooperating with each die for making a lead-receiving hole in the contact ring portion of each base being formed, means for feeding, one by one, base contact rings, each of which has a single aperture in its peripheral portion for receiving a lead wire, means for turning each ring about its axis to a position so that its aperture will register with said plunger pin when it is placed in one of said dies, means for moving each ring until it overlies a die and then releasing it to drop in place therein, with said pin received in its lead aperture, means for feeding molten glass to said die, and means for withdrawing said pin to leave a hole therein for a lead connection to said ring.

JAMES B. WHITMORE.
LOUIS D. MORAND.

REFERENCES CITED

The following references are of record in the file of this patent:

UNITED STATES PATENTS

| Number | Name | Date |
|---|---|---|
| 1,210,238 | Walker et al. | Dec. 26, 1916 |
| 1,227,244 | Buhles | May 22, 1917 |
| 1,536,740 | Akeroyd | May 5, 1925 |
| 1,712,670 | Madden | May 14, 1929 |
| 1,826,505 | Conn | Oct. 6, 1931 |
| 1,990,258 | Trutner | Feb. 5, 1935 |
| 2,120,877 | Uber | June 14, 1938 |
| 2,157,051 | Birdseye | May 2, 1939 |